(12) United States Patent
Tomiyama et al.

(10) Patent No.: US 6,190,803 B1
(45) Date of Patent: *Feb. 20, 2001

(54) NONAQUEOUS SECONDARY BATTERY

(75) Inventors: Hideki Tomiyama; Yoshiaki Noda, both of Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/892,844

(22) Filed: Jul. 11, 1997

(30) Foreign Application Priority Data

Jul. 26, 1996 (JP) .................................... 8-197157

(51) Int. Cl.$^7$ .............................. H01M 4/66; H01M 4/64
(52) U.S. Cl. ...................... 429/245; 429/233; 429/231.1; 429/231.95
(58) Field of Search ............................ 429/231.95, 231.1, 429/233, 245, 242

(56) References Cited

U.S. PATENT DOCUMENTS 5,683,834 * 11/1997 Fujimoto et al. ..................... 429/221

FOREIGN PATENT DOCUMENTS

| 311569 | * 12/1989 | (JP) | H01M/6/16 |
| 2-204976 | 8/1990 | (JP) | H01M/10/40 |
| 6-267542 | 9/1994 | (JP) | H01M/4/66 |

OTHER PUBLICATIONS

ASM Handbook, vol. 2, Library of Congress, ASM International, pp. 15–18, 33, 36–37, 82–87, 1990 No Month.*
ASM Handbook, vol. 4, Library of Congress, ASM International, pp. 869–872, 878, 1991 No Month.*

* cited by examiner

Primary Examiner—Carol Chaney
Assistant Examiner—Tracy Dove
(74) Attorney, Agent, or Firm—Sughrue, Mion, Zinn, Macpeak & Seas, PLLC

(57) ABSTRACT

A nonaqueous secondary battery is disclosed, comprising a positive electrode sheet containing a lithium-containing transition metal oxide as a positive electrode active material, a negative electrode sheet containing a negative electrode material capable of intercalating and deintercalating lithium, and a nonaqueous electrolyte containing a lithium salt, wherein a current collector of said positive electrode sheet is made of an aluminum foil containing 0.6 to 2% by weight of manganese and not more than 1.5% by weight of magnesium and has a thickness of 5 to 200 $\mu$mm. The positive electrode current collector has improved mechanical strength against stress imposed during activation and charge and discharge cycles.

9 Claims, 1 Drawing Sheet

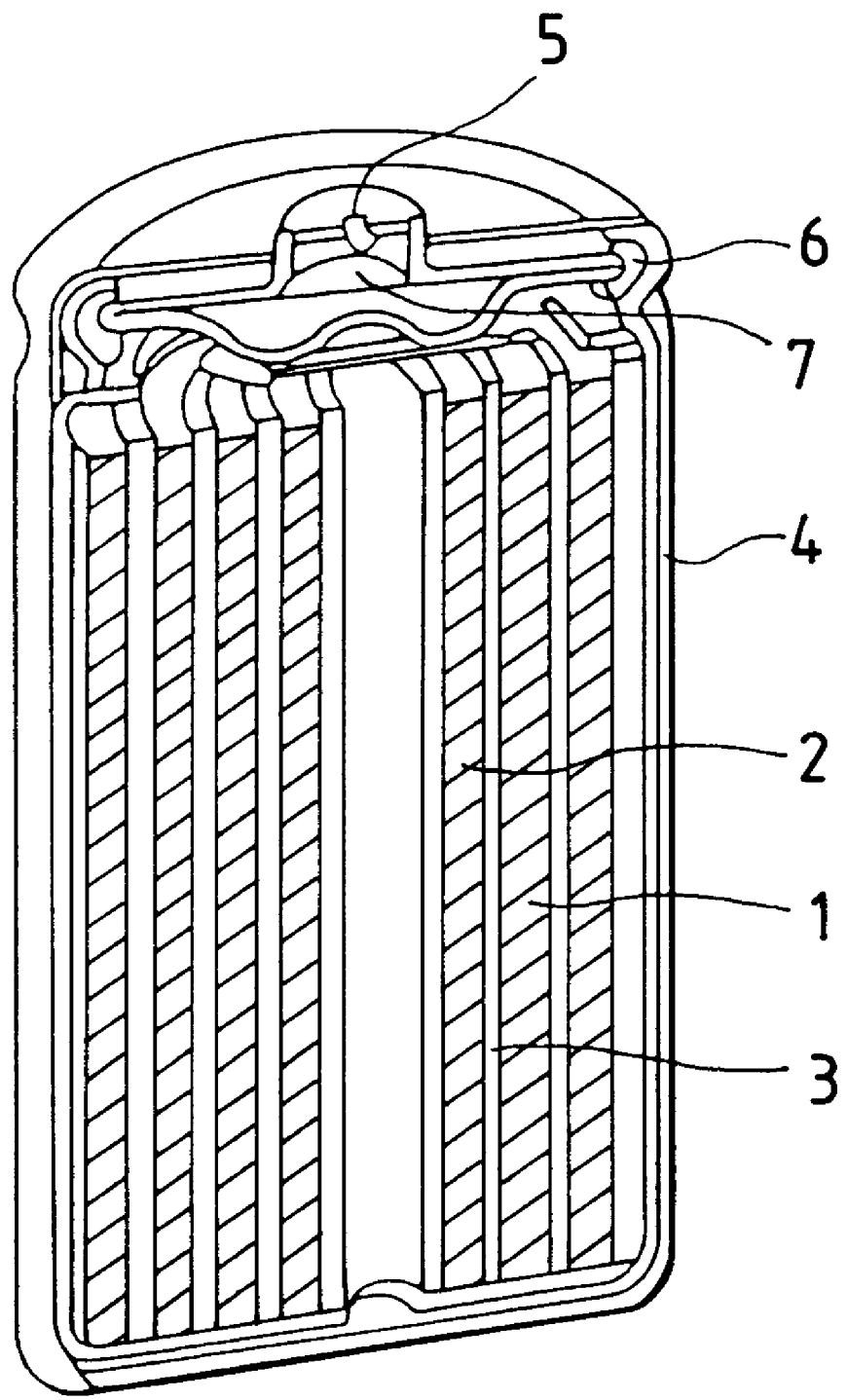

NONAQUEOUS SECONDARY BATTERY

FIELD OF THE INVENTION

This invention relates to a nonaqueous secondary battery having improved storage properties in which the current collector of the positive electrode has improved strength and improved anticorrosion so that the electrode sheet may be prevented from being cut on rolling in assembly of batteries and during a charge of the batteries.

BACKGROUND OF THE INVENTION

With the recent spread of portable electronic equipment, such as mobile phones, video cameras and notebook computers, the demand for high-capacity secondary batteries as a current source, especially nonaqueous secondary batteries utilizing the intercalation-deintercalation reaction of lithium ions, has been increasing. As the functions of the electronic equipment are improved, the demand for higher capacity of secondary batteries has also been desired. Packing an active material into a battery container as much as possible is one approach to achievement of high capacity. Along this line, it has been attempted to reduce elements other than an active material, for example, to make a reduction in thickness of a current collector and to displace the decrease with an active material. However, a current collector having a reduced thickness has reduced strength and tends to be cut on receipt of stress on rolling of an electrode sheet or during a charge. In particular, a positive electrode current collector of a nonaqueous secondary battery is generally made of aluminum foil having relatively low strength among metals and is liable to be cut when its thickness is reduced.

The inventors of the present invention have previously achieved an increase in capacity by using a specific metal oxide having high ability of lithium ion intercalation as a negative electrode active material. However, lithium ion intercalation is accompanied by expansion of the negative electrode active material, which imposes pressure on the positive electrode sheet, causing the sheet to be cut.

Various aluminum alloys (JP-A-2-204976, the term "JP-A" as used herein means an "unexamined published Japanese patent application") and high purity aluminum (JP-A-6-267542) have been proposed for use as a positive electrode current collector of a nonaqueous secondary battery, but these materials are insufficient in mechanical strength under the above situation.

SUMMARY OF THE INVENTION

An object of the present invention is to improve strength and anticorrosion of a positive electrode current collector to prevent it from being cut during rolling or charging thereby to provide a nonaqueous secondary battery having improved storage properties.

The above object is accomplished by a nonaqueous secondary battery comprising a positive electrode sheet containing a lithium-containing transition metal oxide as a positive electrode active material, a negative electrode sheet containing a negative electrode material capable of intercalating and deintercalating lithium, and a nonaqueous electrolyte containing a lithium salt, wherein a current collector of the positive electrode sheet is made of an aluminum foil containing 0.6 to 2% by weight of manganese and not more than 1.5% by weight of magnesium and has a thickness of 5 to 200 $\mu$m.

BRIEF DESCRIPTION OF THE DRAWING

FIG. 1 illustrates a cross-sectional view of a general cylindrical battery.

DETAILED DESCRIPTION OF THE INVENTION

The positive electrode current collector made of aluminum foil according to the present invention has a thickness of 5 to 100 $\mu$m, preferably 10 to 50 $\mu$m.

The aluminum foil for a current collector of the positive electrode sheet used in the present invention preferably contains 0.6 to 2% by weight of manganese and not more than 1.5% by weight of magnesium.

The aluminum foil preferably is an aluminum alloy foil comprising at least one aluminum alloy selected from the group consisting of aluminum alloys of Nos. 3003, 3004, 3005, 3104, 3105, 3204, 3303 and 3307 defined by the Aluminum Association Inc. of U.S.A.; aluminum alloys of Nos. 3203 and 3004A defined by the Aluminum Development Council of Australia; and aluminum alloys of Nos. 3008 and 3009 defined by the Aluminum-Zentrale e.v. of Germany.

Further, the aluminum foil preferably contains 1.05 to 1.9% by weight of manganese and not more then 1.4% by weight of magnesium, and particularly preferably 1.05 to 1.8% by weight of manganese and 0.1 to 1.4% by weight of magnesium.

Also, the aluminum foil particularly preferably is an aluminum alloy foil comprising at least one aluminum alloy selected from the group consisting of aluminum alloys of Nos. 3004, 3005 and 3104 defined by the Aluminum Association Inc. of U.S.A.; aluminum alloy of No. 3004A defined by the Aluminum Development Council of Australia; and aluminum alloy of No. 3009 defined by the Aluminum-Zentrale e.v. of Germany.

Further, the aluminum foil has a tensile strength of preferably 200 N/mm$^2$ or more and more preferably 250 N/mm$^2$ or more, at a room temperature.

Also, the aluminum foil has a breaking extension of preferably 0.4 to 6% and more preferably 0.6 to 5%, at from a room temperature to 250° C.

If desired, the aluminum foil may be subjected to heat treatment. A preferred heat treating temperature ranges from 150 to 350° C., particularly preferably 180 to 330° C. The heat treatment can be carried out either before or after applying a positive electrode active material mixture.

The positive and negative electrodes are prepared by applying a positive electrode active material mixture comprising a positive electrode active material and a negative electrode material mixture comprising a negative electrode material onto the respective current collectors. The positive and negative electrodes may have a protective layer, etc. for mechanical or chemical protection of the electrode material mixture layer.

The positive and negative electrode material mixtures may further contain various additives, such as an electric conducting agent, a binder, a dispersant, a filler, an ion-conductive agent, a pressure increasing agent, and the like.

The positive electrode active material which can be used in the present invention is not particularly limited as long as it is capable of intercalating and deintercalating light metal ions. In particular, it is selected from transition metal oxides and transition metal chalcogenides. Transition metal oxides are preferred, and lithium-containing transition metal composite oxide are particularly preferred.

The transition metals which can be preferably used in the present invention include Ti, V, Cr, Mn, Fe, Co, Ni, Cu, Nb, Mo, and W. Of the compounds of these transition metals, preferred are manganese dioxide, vanadium tetroxide, iron oxide, molybdenum oxide, molybdenum sulfide, cobalt oxide, iron sulfide, and titanium sulfide. These compounds may be used either individually or as a combination of two or more thereof. They can be used in the form of a lithium-containing transition metal composite oxide.

The lithium compound or transition metal compound may be calcined as a mixture with a compound improving ion conductivity, such as a $Ca^{2+}$ compound, or a compound containing P, B or Si and capable of forming an amorphous network (e.g., $P_2O_5$, $Li_3PO_4$, $H_3BO_3$, $B_2O_3$, or $SiO_2$). It may also be mixed and calcined with a compound containing an alkali metal ion (e.g., Na, K or Mg) and/or a compound containing Si, Sn, Al, Ga, Ge, Ce, In, or Bi. The lithium-containing transition metal composite oxide can be synthesized by, for example, calcining a mixture of a lithium compound and a transition metal compound.

Specific examples of preferred positive electrode active materials for use in the invention are described in JP-A-61-5262, U.S. Pat. No. 4,302,518, JP-A-63-299056, JP-A-1-294364, JP-B-4-30146 (the term "JP-B" as used herein means an "examined published Japanese patent publication"), U.S. Pat. Nos. 5,240,794 and 5,153,081, JP-A-4-328258, and JP-A-5-54889. Typical compounds are shown below for illustrative purposes only but not for limitation.

$Li_xCoO_2$, $Li_xNiO_2$, $Li_xCo_aNi_{1-a}O_2$, $Li_xCo_bV_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$, $Li_xMn_bFe_{1-b}O_z$, $Li_xCo_cB_{1-c}O_2$ (wherein x=0.05 to 1.2; a=0.1 to 0.9; b=0.8 to 0.98; c=0.85 to 0.99; and z=1.5 to 5).

The positive electrode active material to be used in the invention can be synthesized by a method comprising mixing and calcining a lithium compound and a transition metal compound or a method comprising a solution reaction. A calcination method is preferred.

The details of calcination are described in JP-A-6-60867 and JP-A-7-14579. These methods can be used. The positive electrode active material obtained by calcination may be used after washing with water, an aqueous acid solution, an aqueous alkali solution, or an organic solvent.

Chemical insertion of lithium ions into a transition metal oxide may be conducted by reacting metallic lithium, a lithium alloy or butyl lithium with a transition metal oxide.

While not limiting, the positive electrode active material of the present invention preferably has an average particle diameter of from 0.1 to 50 μm, and the volume of the particles having a particle diameter of from 0.5 to 30 μm preferably occupies 95% or more by volume of the total particle volume. More specifically, it is preferable that the proportion of a group of particles of 3 μm or less is not more than 18% by volume of the total particles and the proportion of a group of particles of 15 to 25 μm is not more than 18% by volume of the total particles. While the specific surface area of the positive electrode active material is not particularly limited, it is preferably 0.01 to 50 $m^2/g$, more preferably 0.2 to 1 $m^2/g$, in terms of BET specific surface area. When 5 g of the positive electrode active material is dissolved in 100 ml of distilled water, the pH of the supernatant liquid is preferably 7 to 12, more preferably 8 to 11.5.

Where the positive electrode active material is obtained by calcination, the calcination is preferably carried out at 500 to 1500° C., still preferably 700 to 1200° C., particularly preferably 750 to 1000° C., for a calcination time of 4 to 30 hours, still preferably 6 to 20 hours, particularly preferably 6 to 15 hours.

The negative electrode material for use in the present invention is not particularly limited as long as it is capable of intercalating and deintercalating light metal ions. In particular, light metals, light metal alloys, carbonaceous compounds, inorganic oxides, inorganic chalcogenides, metal complexes, and organic polymers are preferred. These negative electrode materials can be used either individually or as a combination thereof. For example, a combination of a light metal and a carbonaceous compound, a combination of a light metal and an inorganic oxide, or a combination of a light metal, a carbonaceous compound, and an inorganic oxide may be mentioned as an example. These negative electrode materials are preferred; for they bring about such effects as a high capacity, a high discharge potential, high safety, and excellent cycle properties.

The light metals preferably include lithium. The light metal alloys include those containing a metal capable of forming an alloy with lithium and those containing lithium. Al, Al—Mn, Al—Mg, Al—Sn, Al—In, and Al—Cd are particularly preferred.

The carbonaceous compound is selected from the group consisting of natural graphite, artificial graphite, vapor phase growth carbon, carbon of calcined organic substances, and the like, with those having a graphite structure being preferred. The carbonaceous compound may contain, in addition to carbon, 0 to 10% by weight of compounds of other elements, e.g., B, P, N, S, SiC and $B_4C$.

Examples of elements which constitute the inorganic oxide or chalcogenide include transition metals or the metals and semimetals preferably belonging to the groups 13 to 15 of the Periodic Table.

The transition metal compounds preferably include an oxide, a composite oxide or a chalcogenide of V, Ti, Fe, Mn, Co, Ni, Zn, W, and Mo. Still preferred compounds are $Li_pCo_qV_{1-q}O_r$, wherein p=0.1 to 2.5, q=0 to 1; and z=1.3 to 4.5, disclosed in JP-A-6-44972.

The metals or semimetals other than the transition metals in the oxides or chalcogenides include elements of the groups 13 to 15 of the Periodic Table (e.g., Al, Ga, Si, Sn, Ge, Pb, Sb, and Bi) and combinations of two or more thereof. Examples of preferred oxides and chalcogenides of these elements include $Al_2O_3$, $Ga_2O_3$, SiO, $SiO_2$, GeO, $GeO_2$, SnO, $SnO_2$, $SnSiO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, $SnSiO_3$, GeS, $GeS_2$, SnS, $SnS_2$, PbS, $PbS_2$, $Sb_2O_3$, $Sb_2S_5$, and $SnSiS_3$. These compounds may Li-containing composite oxides, such as $Li_2GeO_3$ and $Li_2SnO_2$.

It is preferable that these composite chalcogenides and composite oxides are predominantly amorphous at the time of assembly into a battery. The terminology "predominantly amorphous" as used herein means that a substance has a broad scattering band having a peak at 20 to 40° in terms of a 2θ value in X-ray diffractometry using CuKα rays. The substance may also exhibit a diffraction line assigned to a crystalline structure. It is preferable that the maximum intensity of the band assigned to a crystalline structure which appears at 40 to 70° in terms of a 2θ value is not higher than 500 times, more preferably not higher than 100 times, particularly preferably not higher than 5 times, the peak intensity of the broad scattering band which appears at 20 to 40° in terms of a 2θ value. It is most preferred that the compound has no diffraction line attributed to a crystalline structure.

Of the above-mentioned composite oxides and composite chalcogenides comprising the element(s) selected from transition metals and the elements of groups 13 to 15 of the Periodic Table, those mainly comprising two or more elements selected from the group consisting of B, Al, Ga, In, Tl, Si, Ge, Sn, Pb, P, As, Sb, and Bi are preferred. Composite oxides comprising these elements are more preferred. Composite oxides mainly comprising two or more elements selected from the group consisting of B, Al, Si, Ge, Sn, and P are particularly preferred.

These composite chalcogenides and composite oxides may contain an element of the groups 1 to 3 of the Periodic Table or a halogen element chiefly for modification of the amorphous structure. They may also contain a transition metal.

Of the above-described negative electrode materials, amorphous composite oxides mainly comprising tin are particularly preferred, represented by formula (I) or (II):

$$SnM^1_aO_t \quad (I)$$

wherein $M^1$ represents at least two elements selected from the group consisting of Al, B, P, Si, Ge, elements of groups 1 to 3 of the Periodic Table, and halogen elements; a represents a number of from 0.2 to 2; and t represents a number of from 1 to 6.

$$Sn_xT_{1-x}M^1_aO_t \quad (II)$$

wherein T represents a transition metal selected from the group consisting of V, Ti, Fe, Mn, Co, Ni, Zn, W, and Mo; x represents a number of from 0.1 to 0.9; and $M^1$, a, and t are as defined above.

Of the compounds represented by formula (I), those represented by formula (III) are more preferred.

$$SnM^2_bO_t \quad (III)$$

wherein $M^2$ represents at least two elements selected from the group consisting of Al, B, P, Ge, elements of groups 1 to 3 of the Periodic Table, and halogen elements; b represents a number of from 0.2 to 2; and t represents a number of from 1 to 6.

Of the compounds represented by formula (III), those represented by formula (IV) are particularly preferred.

$$SnM^3_cM^4_dO_t \quad (IV)$$

wherein $M^3$ represents at least one element selected from the group consisting of Al, B, P, and Ge; $M^4$ represents at least one element selected from the group consisting of elements of groups 1 to 3 of the Periodic Table and halogen elements; c represents a number of from 0.2 to 2; d represents a number of from 0.01 to 1; provided that $0.2<c+d<2$; and t represents a number of from 1 to 6.

The amorphous composite oxides represented by formulae (I) to (IV) can be synthesized by a calcination method or a solution method. A calcination method is preferred. In a calcination method, oxides or compounds of the elements shown in formula (I) or (II) are mixed well and calcined. Calcination is carried out preferably at a rate of temperature rise of 5° to 200° C./min, at a calcination temperature of 500° to 1500° C. for a period of 1 to 100 hours. After calcination, the system is cooled preferably at a rate of temperature drop of 2 to $10^{7°}$ C./min.

The term "rate of temperature rise" as used herein means an average rate of temperature rise of from 50% of the calcination temperature (° C.) to 80% of the calcination temperature (° C.), and the term "rate of temperature drop" as used herein means an average rate of temperature drop of from 80% of the calcination temperature (° C.) to 50% of the calcination temperature (° C.).

Cooling of the calcined product may be effected either within a calcining furnace or out of the furnace, for example, by pouring the product into water. Super-quenching methods described in *Ceramics Processing*, p. 217, Gihodo Shuppan (1987), such as a gun method, a Hammer-Anvil method, a slap method, a gas atomizing method, a plasma spray method, a centrifugal quenching method, and a melt drag method, can also be used. Further, cooling may be conducted by a single roller method or a twin-roller method described in *New Glass Handbook*, p. 172, Maruzen (1991). Where the material melts during calcination, the calcined product may be taken out continuously while feeding the raw materials to the furnace. The melt is preferably stirred during calcination.

The calcining atmosphere preferably has an oxygen content of not more than 5% by volume. An inert gas atmosphere is more preferred. Examples of suitable inert gases include nitrogen, argon, helium, krypton, and xenon. The most preferred inert gas is pure argon.

The negative electrode active material of the present invention preferably has an average particle diameter of from 0.1 to 60 µm, particularly preferably 0.7 to 25 µm, with the particle diameter of at least 60% by volume of the total particles preferably falling within a range of from 0.5 to 30 µm. More preferably, the proportion of a group of particles of 1 µm or smaller is not more than 30% by volume of the total particles, and the proportion of a group of particles of 20 µm or greater is not more than 25% by volume of the total particles. It is needless to say that the particle diameter of the negative electrode material used should not exceed the thickness of the electrode material mixture on one side of the negative electrode.

The term "average particle diameter" as used herein means a median size of primary particles, which can be measured with a laser diffraction type particle size distribution measuring apparatus.

Well-known grinding machines and classifiers can be used for particle size adjustment. Examples of useful grinding machines include a mortar, a ball mill, a sand mill, a vibration (ball) mill, a satellite ball mill, a planetary ball mill, and spinning air flow type jet mill. If necessary, the grinding can be conducted in a wet process using water or an organic solvent, such as methanol. In order to adjust to a prescribed size, the ground particles are preferably classified. The manner of classification is not particularly limited, and a sieve, an air classifier, etc. can be used appropriately. Classification can be carried out either in a dry process or a wet process.

Specific but non-limiting examples of the negative electrode material useful in the present invention are shown below.

$SnAl_{0.4} B_{0.5} P_{0.5} K_{0.1} O_{3.65}$ $SnAl_{0.4} B_{0.5} P_{0.5} Na_{0.2} O_{3.7}$ $SnAl_{0.4} B_{0.3} P_{0.5} Rb_{0.2} O_{3.4}$ $SnAl_{0.4} B_{0.5} P_{0.5} CS_{0.1} O_{3.65}$ $SnAl_{0.4} B_{0.5} P_{0.5} K_{0.1} Ge_{0.05} O_{3.85}$ $SnAl_{0.4} B_{0.5} P_{0.5} K_{0.1} Mg_{0.1} Ge_{0.02} O_{3.83}$ $SnAl_{0.4} B_{0.4} P_{0.4} O_{3.2}$ $SnAl_{0.3} B_{0.5} P_{0.2} O_{2.7}$ $SnAl_{0.3} B_{0.5} P_{0.2} O_{2.7}$ $SnAl_{0.4} B_{0.5} P_{0.3} Ba_{0.08} Mg_{0.08} O_{3.26}$ $SnAl_{0.4} B_{0.4} P_{0.4} Ba_{0.08} O_{3.28}$ $SnAl_{0.4} B_{0.5} P_{0.5} O_{3.6}$ $SnAl_{0.4} B_{0.5} P_{0.5} Mg_{0.1} O_{3.7}$ $SnAl_{0.5} B_{0.4} P_{0.5} Mg_{0.1} F_{0.2} O_{3.65}$ $SnB_{0.5} P_{0.5} Li_{0.1} Mg_{0.1} F_{0.2} O_{3.05}$ $SnB_{0.5} P_{0.5} K_{0.1} Mg_{0.1} F_{0.2} O_{3.05}$ $SnB_{0.5} P_{0.5} K_{0.05} Mg_{0.05} F_{0.1} O_{3.03}$ $SnB_{0.5} P_{0.5} K_{0.05} Mg_{0.1} F_{0.2} O_{3.03}$ $SnAl_{0.4} B_{0.5} P_{0.5} Cs_{0.1} Mg_{0.1} F_{0.2} O_{3.65}$ $SnB_{0.5} P_{0.5} Cs_{0.05} Mg_{0.05} F_{0.1} O_{3.03}$ $SnB_{0.5} P_{0.5} Mg_{0.1} F_{0.1} O_{3.05}$ $SnB_{0.5} P_{0.5} Mg_{0.1} F_{0.2} O_3$ $SnB_{0.5} P_{0.5} Mg_{0.1} F_{0.06} O_{3.07}$ $SnB_{0.5} P_{0.5} Mg_{0.1} F_{0.14} O_{3.03}$ $SnPBa_{0.08} O_{3.58}$ $SnPK_{0.1} O_{3.55}$ $SnPK_{0.05} Mg_{0.05} O_{3.58}$ $SnPCs0.1 O_{3.55}$ $SnPBa_{0.08} F_{0.08} O_{3.54}$ $SnPK_{0.1} Mg_{0.1} F_{0.2} O_{3.55}$ $SnPK_{0.05} Mg_{0.05} F_{0.1} O_{3.53}$ $SnPCs_{0.1} Mg_{0.1} F_{0.2} O_{3.55}$ $SnPCs_{0.05} Mg_{0.05} F_{0.1} O_{3.53}$

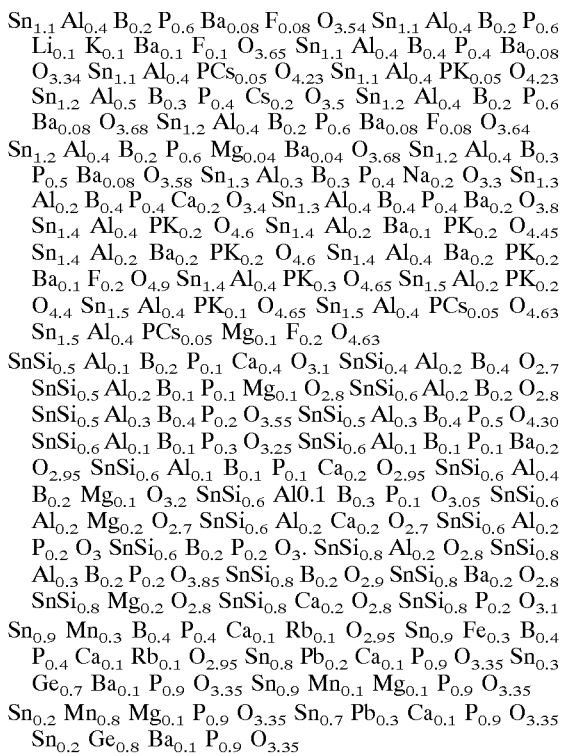

The chemical formula of the compound as obtained by calcination can be determined by inductively coupled plasma (ICP) emission spectroscopic analysis or, more conveniently, by calculation making use of the difference in powder weight between before and after the calcination.

A light metal is inserted into the negative electrode material till the electrode potential approximates to the deposition potential of that light metal. For example, the amount inserted is preferably 50 to 700 mol %, more preferably 100 to 600 mol %, per the negative electrode material. The amount released is preferably as much as possible with reference to the amount inserted. Insertion of a light metal is preferably performed by an electrochemical process, a chemical process or a thermal process. An electrochemical process and a chemical process are still preferred. The electrochemical process is preferably carried out by electrochemically inserting the light metal present in the positive electrode active material or directly inserting a light metal from a light metal or an alloy thereof. The chemical process can be carried out by mixing or contacting the negative electrode material with a light metal or reacting the negative electrode material with an organometallic compound, e.g., butyl lithium. Lithium or a lithium ion is a particularly preferred light metal to be used.

The negative electrode material of the present invention may contain various elements as a dopant. For example, it may contain a lanthanide metal (e.g., Hf, Ta, W, Re, Os, Ir, Pt, Au, and Hg) or a compound affording improved electron conductivity (e.g., an Sb, In or Nb compound). The total amount of these dopant compounds added is preferably 0 to 5 mol %.

The surface of the oxide as a positive electrode active material or the negative electrode material can be coated with an oxide having a different chemical formula from the positive electrode active material or the negative electrode material. The surfacing oxide is preferably one containing a compound soluble in both an acidic solution and an alkaline solution. The surfacing oxide is more preferably one having high electron conductivity. Such preferred metal oxides include $PbO_2$, $Fe_2O_3$, $SnO_2$, $In_2O_3$, and ZnO. It is also preferable to incorporate a dopant (e.g., a metal of different valence as an oxide, a halogen atom, etc.) into these oxides. Particularly preferred of them are $SiO_2$, $SnO_2$, $Fe_2O_3$, ZnO, and $PbO_2$.

The amount of the surfacing metal oxide for surface-treatment is preferably 0.1 to 10% by weight, more preferably 0.2 to 5% by weight, particularly preferably 0.3 to 3% by weight, based on the positive electrode active material or the negative electrode material.

The surface of the positive electrode active material or the negative electrode material may be modified by treating with, for example, an esterifying agent, a chelating agent, a conductive polymer, polyethylene oxide, and the like.

The surface of the negative electrode material may also be modified by, for example, providing a layer comprising an ion-conductive polymer or polyacetylene. The positive electrode active material or the negative electrode material may be subjected to purification processing, such as washing with water.

In addition to the positive electrode active material or a negative electrode material, the electrode material mixture can contain an electrically conducting agent (hereinafter simply referred to as a conducting agent), a binder, a dispersant, a filler, an ion-conductive agent, a pressure increasing agent, and other additives.

The conducting agent to be used can be any electron conducting material which undergoes no chemical change in an assembled battery. Useful conducting agents include natural graphite (scale graphite, flake graphite, and lumpy graphite); artificial graphite; carbon black, such as acetylene black, Ketjen black, channel black, furnace black, lamp black, and thermal black; electrically conductive fibers, such as carbon fiber and metal fiber; metal powders, such as powders of copper, nickel, aluminum or silver; electrically conductive whiskers, such as zinc oxide whiskers and potassium titanate whiskers; electrically conductive metal oxides, such as titanium oxide; and electrically conductive organic materials, such as polyphenylene derivatives. These conducting agents can be used either individually or as a mixture thereof. Particularly preferred of these conducting agents is acetylene black or a combination of graphite and acetylene black. In preparing an electrode material mixture as a water-dispersion paste, it is advantageous to previously disperse the conducting agent in water before mixing with other components.

While not limiting, the conducting agent is preferably used in an amount of 1 to 50%, particularly 1 to 30%, by weight based on the electrode material mixture. In particular, carbon black or graphite is preferably used in an amount of 2 to 15% by weight.

The binder which can be used in the electrode material mixture layer and the non-active layer containing no active substance includes polysaccharides, thermoplastic resins, and rubbery polymers or mixtures thereof. Examples of suitable binders include starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, an ethylene-propylene-diene terpolymer (EPDM), sulfonated EPDM, a styrene-butadiene rubber, polybutadiene, a fluorine rubber, and polyethylene oxide. In using a compound having a functional group reactive with lithium, such as a polysaccharide, it is preferable to deactivate the functional group by addition of a compound having, for example, an isocyanate group. While not limiting, the binder is preferably used in an amount of 1 to 50% by weight, more preferably 2 to 30% by weight, based on the electrode material mixture. The distribution of the binder in the electrode material mixture may be either uniform or non-uniform.

Polymers having a decomposition temperature of 300° C. or more are preferred binders. Examples of such the polymers include polyethylene, polypropylene, polytetrafluoroethylene (PTFE), polyvinylidene fluoride (PVDF), a tetrafluoroethylene-hexafluoropropylene copolymer (FEP), a tetrafluoroethylene-perfluoroalkyl vinyl ether copolymer (PFA), a vinylidene fluoride-hexafluoropropylene copolymer, a vinylidene fluoride-chlorotrifluoroethylene copolymer, an ethylene-tetrafluoroethylene copolymer (ETFE resin), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexaflfuoropropylene-tetrafluoroethylene copolymer, and a vinylidene fluoride-perfluoromethyl vinyl ether-tetrafluoroethylene copolymer.

The filler to be used in the invention is not particularly limited as long as it is a fibrous material which undergoes no chemical change in an assembled battery. Fibers of polyolefins (e.g., polypropylene or polyethylene), glass fiber, and carbon fiber are usually used. While not limiting, the filler is preferably used in an amount of up to 30% by weight based on the active material mixture.

Compounds known as an organic or inorganic solid electrolyte can be used as an ion-conductive agent. The particulars of ion-conductive agents are described later with respect to an electrolytic solution. The pressure increasing agent used in the present invention is a compound capable of increasing the inner pressure as hereinafter described. Carbonates can be mentioned as a typical example of the pressure increasing agent.

The electrolytic solution used in the present invention is generally composed of a solvent and a lithium salt (composed of an anion and a lithium cation) soluble in the solvent. Examples of suitable solvents include aprotic organic solvents, such as propylene carbonate, ethylene carbonate, butylene carbonate, dimethyl carbonate, diethyl carbonate, methylethyl carbonate, γ-butyrolactone, methyl formate, methyl acetate, 1,2-dimethoxyethane, tetrahydrofuran, 2-methyltetrahydrofuran, dimethyl sulfoxide, dioxolane (e.g., 1,3-dioxolane), formamide, dimethylformamide, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, and 1,3-propanesultone. These solvents may be used either individually or as a mixture of two or more thereof. Examples of suitable anions of the lithium salts soluble in these solvents include $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^{2-}$, (1,2-dimethoxyethane)$_2ClO_4^-$, lower aliphatic carboxylate ions, $AlCl_4^-$, $Cl^-$, $Br^-$, $I^-$, anions of chloroboran compounds, and tetraphenylborate ions. These lithium salts may be used either individually or as a combination of two or more thereof. The electrolytic solution preferably contains, as a solvent, a cyclic carbonate (e.g., ethylene carbonate or propylene carbonate) and/or an acyclic carbonate (e.g., diethyl carbonate, dimethyl carbonate, or methyl ethyl carbonate). In particular, the electrolytic solution preferably comprises a supporting electrolyte containing $LiCF_3SO_3$, $LiClO_4$, $LiBF_4$ and/or $LiPF_6$ and a mixed solvent of ethylene carbonate and propylene carbonate, 1,2-dimethoxyethane, dimethyl carbonate or diethyl carbonate at an appropriate mixing ratio. A supporting salt containing $LiPF_6$ is especially preferred.

The amount of the electrolytic solution to be used in a battery is not particularly limited and can be determined according to the amounts of the positive electrode active material and the negative electrode material or the size of the battery.

While not limiting, the concentration of the supporting electrolyte is preferably from 0.2 to 3 mol per liter of the electrolytic solution.

In addition to the above-mentioned electrolytic solution, organic or inorganic solid electrolytes may also be employed. Examples of suitable inorganic solid electrolytes include lithium nitride, a lithium halide, and a lithium oxyacid salt. Among them, $Li_3N$, $LiI$, $Li_5NI_2$, $Li_3N$—$LiI$—$LiOH$, $Li_4SiO_4$, $Li_4SiO_4$—$LiI$—$LiOH$, $xLi_3PO_4$—$(1-x)Li_4SiO_4$, $Li_2SiS_3$, and phosphorus sulfide compounds are effective.

Examples of effective organic solid electrolytes include polyethylene oxide derivatives or polymers containing the same, polypropylene oxide derivatives or polymers containing the same, polymers containing an ion dissociation group, a mixture of a polymer containing an ion dissociation group and the above-mentioned aprotic electrolytic solution, phosphoric acid ester polymers, and high polymeric matrix materials containing an aprotic polar solvent. Polyacrylonitrile may be added to the electrolytic solution. A combined use of an organic solid electrolyte and an inorganic solid electrolyte is also known.

For the purpose of improving charge and discharge characteristics, the electrolytic solution may contain other compounds, such as pyridine, triethyl phosphite, triethanolamine, a cyclic ether, ethylenediamine, n-glyme, hexaphosphoric triamide, a nitrobenzene derivative, sulfur, a quinoneimine dye, an N-substituted oxazolidinone and an N,N'-substituted imidazolidinone, an ethylene glycol dialkyl ether, a quaternary ammonium salt, polyethylene glycol, pyrrole, 2-methoxyethanol, $AlCl_3$, a monomer providing a conductive polymer as an electrode active material, triethylenephosphoramide, a trialkylphosphine, morpholine, an aryl compound having a carbonyl group, a crown ether (e.g., 12-crown-4), hexamethylphosphoric triamide and a 4-alkylmorpholine, a bicyclic tertiary amine, an oil, a quaternary phosphonium salt, and a tertiary sulfonium salt.

In order to make the electrolytic solution incombustible, a halogen-containing solvent, such as carbon tetrachloride or trifluorochloroethylene, may be added to the electrolytic solution. In order to make the electrolytic solution suitable to high-temperature storage, carbonic acid gas may be incorporated thereto.

The positive or negative electrode material mixture may contain an electrolytic solution or an electrolyte. For example, it is known to add the above-mentioned ion-conductive polymer, nitromethane, or an electrolytic solution to the electrode material mixture.

As a separator, an insulating finely porous thin film having high ion permeability and prescribed mechanical strength is used. The film preferably has such a function that the pores are closed at 80° C. or higher to increase the resistance. A sheet or nonwoven fabric made of an olefin polymer (e.g., polypropylene and/or polyethylene) or glass fiber is used in view of their organic solvent resistance and hydrophobic properties. The pore size of the separator is selected from the range generally used for batteries, e.g., from 0.01 to 10 μm. The thickness of the separator is selected from the range generally used for batteries, e.g., from 5 to 300 μm. The separator is prepared by making a synthesized polymer porous by a dry process, stretching, solution removal, solvent removal, or a combination thereof.

While a current collector for a positive electrode is made of the aforesaid aluminum foil, the current collector may have thereon an electrically conducting film containing conductive particles, such as carbon black, graphite, and metallic powder.

Any electron conducting substance which undergoes no chemical change in an assembled battery can be used as a current collector for the negative electrode. Examples of suitable materials of the current collector for the negative electrode include stainless steel, nickel, copper, titanium, aluminum, carbon; copper or stainless steel with its surface treated with carbon, nickel, titanium or silver; and Al—Cd alloys. Copper or a copper alloy is particularly preferred. These materials may be subjected to surface oxidation. It is desirable to make unevenness on the surface of the current collector by surface treatment. The current collector may have a variety of forms, such as a film, a foil, a sheet, a net, a punched sheet, a lath, a porous body, a foamed body, a fibrous body, and so on. While not limiting, the thickness of the current collector is from 1 to 500 $\mu$m.

The battery of the present invention may have any form, such as a sheet, a cylinder, a flat shape, an angular shape, and the like.

The positive or negative electrode material mixture is usually coated to the respective current collector, dried, and compressed. General coating techniques, such as reverse roll coating, direct roll coating, blade coating, knife coating, extrusion coating, curtain coating, gravure coating, bar coating, dip coating and squeeze coating, can be used. Blade coating, knife coating and extrusion coating techniques are preferred. Coating is preferably carried out at a speed of 0.1 to 100 m/min.

The coating technique should be chosen in agreement with the physical properties and drying properties of the coating composition of the electrode material mixture so as to form a coating layer having a satisfactory surface condition. The both sides of the current collector are coated either successively or simultaneously. The coating layer on each side may be continuous, discontinuous, or may have a stripe pattern. While the thickness, length and width of the coating layer depend on the size of the battery, a preferred thickness as dried and compressed is 1 to 2000 $\mu$m per side.

Drying or dehydration of a coated sheet is conducted by a generally employed means, preferably hot air, vacuum, infrared rays, far infrared rays, electron beams, and low humidity air, either alone or a combination thereof. The drying temperature preferably ranges from 80° to 350° C., and more preferably from 100° to 250° C. From the viewpoint of charge and discharge cycle characteristics, drying is preferably effected to such an extent that the positive and negative electrode material mixture layers and the electrolytic solution may each have a water content of not more than 500 ppm, with the total battery water content being not more than 2000 ppm.

Compression of the coated sheet may be carried out by a generally employed means, and preferably by pressing in a mold or calendering. While not limiting, the pressing pressure is preferably 0.2 to 3 t/cm$^2$. The pressing speed in calendering is preferably 0.1 to 50 m/min. The pressing temperature is preferably from room temperature to 200° C. The ratio of the width of the positive electrode sheet to that of the negative electrode sheet is preferably 0.9 to 1.1, particularly 0.95 to 1.0. The ratio of the content of the positive electrode active material and that of the negative electrode material cannot be specified because it depends on the kinds of compounds used and the compounding ratio in the preparation of the electrode material mixture. That ratio can be optimized with the capacity, cycle characteristics, and safety being taken into consideration.

A positive electrode sheet and a negative electrode sheet are laid one another via a separator and put into a battery case in a rolled or folded form. The sheets and the case are electrically connected, an electrolytic solution is poured into the case, and the case is closed with a sealing plate. A safety valve may be used as a sealing plate. Various well-known safety elements may also be provided. For example, a fuse, a bimetal, a PTC element, etc. may be used as an element for prevention of over-current. In addition to the safety valve, an increase in inner pressure may be coped with by making cuts on a battery case, making cracks in a gasket, making cracks in a sealing plate, or a mechanism of cut-off from a lead plate. A countermeasure against overcharge or overdischarge may be integrally incorporated into the circuit of a charger, or such a protective circuit may be separately connected to a charger. As a countermeasure against overcharge, the battery may be provided with a system of breaking off the current with an increase of the inner pressure. In this case, a compound which increases the inner pressure can be incorporated into the electrode material mixture or the electrolytic solution. Examples of such a pressure increasing agent include carbonates, such as $Li_2CO_3$, $LiHCO_3$, $Na_2CO_3$, $NaHCO_3$, $CaCO_3$, and $MgCO_3$.

A battery case and a lead plate are made of an electrically conductive metal or alloy, such as iron, nickel, titanium, chromium, molybdenum, copper, aluminum, and alloys thereof. The cap, case, electrode sheets and lead plate can be joined by a well-known welding technique, such as direct current or alternating current electric welding, laser welding or ultrasonic welding. Conventional compounds or mixtures known as a sealing compound, such as asphalt, can be used as a sealant for the battery.

Application of the nonaqueous secondary battery of the present invention is not particularly limited. For example, it is mounted in electronic equipment, such as notebook color or monochromatic personal computers, sub-notebook personal computers, pen touch computers, pocket (palm-top) personal computers, notebook word processors, pocket word processors, electronic book players, potable phones, wireless phone extensions, pagers, handy terminals, portable facsimiles, portable copiers, portable printers, headphone stereos, video cameras, liquid crystal TV sets, handy cleaners, portable CD, mini disk systems, electrical shavers, machine translation systems, land mobile radiotelephones, transceivers, electrical tools, electronic notebooks, calculators, memory cards, tape recorders, radios, backup powers, and so on. For domestic use, it is useful in automobiles, electrically-powered vehicles, motors, lights, toys, family (home) computers, load conditioners, irons, watches, stroboscopic lamps, cameras, medical equipment (e.g., pacemakers, hearing aids, and massaging machines). It is also applicable to military equipment and spacecraft equipment. The nonaqueous secondary battery of the present invention may be used in combination with other secondary batteries, solar batteries or primary batteries.

In carrying out the invention, it is desirable to combine the above-described preferred chemical materials and preferred battery constituent parts. Particularly preferred combinations are as follows. The positive electrode active material comprises at least one compound selected from the group consisting of $Li_xCoO_2$, $Li_xNiO_2$, $Li_xMnO_2$, and $Li_xMn_2O_4$ (wherein x=0.05 to 1.2), and the conducting agent comprises acetylene black. The positive electrode current collector is a net, a sheet, a foil, a lath, etc. made up of stainless steel or aluminum. The negative electrode material contains at least one compound containing metallic lithium, a lithium alloy (e.g., Li—Al), a carbonaceous compound, an oxide (e.g., $LiCoVO_4$, $SnO_2$, SnO, SiO, $GeO_2$, GeO, $SnSiO_3$, and $SnSi_{0.3}Al_{0.1}B_{0.2}P_{0.3}O_{3.2}$), a sulfide (e.g., $TiS_2$, $SnS_2$, SnS, $GeS_2$ and GeS), and the like. The negative electrode current collector is a net, a sheet, a foil, a lath, etc. made up of stainless steel or copper. The electrode material mixture containing the positive electrode active material or the negative electrode material may contain a carbonaceous material, such as acetylene black or graphite, as an electron-conductive agent. The binder is selected from the group consisting of fluorine-containing thermoplastic compounds, such as polyvinylidene fluoride and polyfluoroethylene, acrylic acid-containing polymers, elastomers, such as styrene-butadiene rubber and an ethylene-propylene terpolymer, and mixtures thereof. The electrolytic solution contains a combination of cyclic carbonates (e.g., ethylene carbonate) and acyclic carbonates (e.g., diethyl carbonate or dimethyl carbonate) or ester compounds (e.g., ethyl acetate) and, as a supporting electrolyte, $LiPF_6$. In addition, a lithium salt, such as $LIBF_4$ or $LiCF_3SO_3$, can be used in combination. The separator is made of polypropylene, polyethylene or a combination thereof. The shape of the battery may be any of a cylinder, a flat shape, and an angular shape. The battery is preferably provided with a means with which safety can be assured even in case of errors, such as an explosion-proof valve of inner pressure release type, an explosion-proof valve of current break-off type, and a separator which increases its resistance at high temperatures.

The present invention will now be illustrated in greater detail with reference to Examples, but it should be understood that the invention is not construed as being limited thereto. Unless otherwise indicated, all the parts are by weight.

EXAMPLE 1

A mixture of 86 parts of $SnB_{0.2}P_{0.5}K_{0.1}Mg_{0.1}Ge_{0.1}O_{2.8}$ (negative electrode active material), 3 parts of acetylene black (conducting agent), 6 parts of graphite (conducting agent), 4 parts of polyvinylidene fluoride (binder), and 1 part of carboxymethyl cellulose (binder) was kneaded with water to prepare a slurry of a negative electrode material mixture.

A slurry for an auxiliary layer was prepared by mixing 88 parts of α-alumina, 9 parts of graphite, and 3 parts of carboxymethyl cellulose.

The resulting slurries were applied to both sides of a 10 µm thick copper foil by extrusion coating with the slurry of the negative electrode material mixture as a lower layer and the slurry for the auxiliary layer as an upper layer, dried, and compression molded by calendering to obtain a negative electrode sheet (2) having a width of 55 mm, a length of 520 mm, and a thickness of 110 µm.

A mixture of 87 parts of $LiCoO_2$ (positive electrode active material), 3 parts of acetylene black (conducting agent), 6 parts of graphite (conducting agent), 3 parts of Nipol 820B (a binder resin produced by Nippon Zeon Co., Ltd.), and 1 part of carboxymetlyl cellulose (binder) was kneaded with water to prepare a slurry of a positive electrode material mixture.

The resulting slurry was applied to each side of an aluminum foil (current collector) shown in Table 1 below by extrusion coating, dried, and compression molded by calendering to form a positive electrode sheet (1) having a width of 53 mm, a length of 445 mm, and a thickness of 190 µm.

A nickel lead plate and an aluminum lead plate were welded onto the end of the negative electrode sheet (2) and the positive electrode sheet (1), respectively, and the electrode sheets were heat treated at 230° C. for 1 hour by means of a far infrared heater in a dry air atmosphere having a dew point of −40° C. or lower. Lithium foil strips (purity: 99.8%) having a width of 4 mm and a length of 55 mm were adhered to the whole length of the heat-treated negative electrode sheet at 10 mm intervals with the length direction of the strips forming right angles with the length direction of the electrode sheet.

The heat-treated positive electrode sheet (1), a finely porous polyethylene/polypropylene film separator (3), the heat-treated negative electrode sheet (2), and the separator (3) were laid, one on top of the other, in this order and rolled up into a cylinder.

The roll was put in a nickel-plated iron-made closed-end battery case (4), and an electrolytic solution comprising a 2:5:3 (by weight) mixed solvent of ethylene carbonate, diethyl carbonate, and dimethyl carbonate, 0.95 mol/l of $LiPF_6$, and 0.05 mol/l of $LiBF_4$ as electrolytes was poured into the case. A cap (5) serving as a positive electrode terminal was cramped to the open top via a gasket (6) to prepare a cylindrical battery having a height of 65 mm and an outer diameter of 18 mm. The positive electrode terminal (5) had previously been connected to the positive electrode sheet (1), and the battery case (4) to the negative electrode sheet (2), respectively, via respective lead terminals. The cross section of the resulting cylindrical battery is shown in FIG. 1, in which reference numeral (7) indicates an explosion-proof valve. Fifty batteries were made for every positive electrode current collector.

The resulting batteries were each submitted to a constant-current constant-voltage (CCCV) charge at 0.2 A to an open circuit voltage of 3.0 V and stored in a thermostat at 50° C. for 2 weeks. After the storage, the battery was further subjected to a CCCV charge at 0.6 A to 4.1 V and then a discharge at a constant current of 0.6 A to 2.8 V for activation. Thereafter, the battery was subjected to a charge and discharge cycle test by repeating CCCV charges at 1.2 A to 4.1 V and constant voltage discharges at 1.5 A to 2.8 V.

The occurrence of a cut of the positive electrode sheet during the activation and the charge and discharge cycles was examined. The results obtained are shown in Table 1 below.

TABLE 1

| JIS Number | Mn Content (%) | Mg Content (%) | Heat-Treating Temp. (° C.) | Cut of Positive Electrode Sheet Activation | Cycles | Remark |
|---|---|---|---|---|---|---|
| 3003 | 1.0–1.5 | — | — | 0/50 | 0/50 | Invention |
| 3004 | 1.0–1.5 | 0.8–1.3 | — | 0/50 | 0/50 | " |
| 3203 | 1.0–1.5 | — | — | 0/50 | 0/50 | " |
| 3104 | 0.8–1.4 | 0.8–1.3 | — | 0/50 | 0/50 | " |
| 3003 | 1.0–1.5 | — | 180 | 0/50 | 0/50 | " |
| 3003 | 1.0–1.5 | — | 300 | 0/50 | 0/50 | " |
| 1N30 | 0.05 | 0.05 | — | 3/50 | 4/50 | Comparison |
| 1085 | 0.02 | 0.02 | — | 2/50 | 3/50 | Comparison |

As is apparent from the results in Table 1, in the batteries using the aluminum foil as specified in the present invention as a positive electrode current collector, the current collector has improved mechanical strength against cutting due to stress imposed during activation and charge and discharge cycles.

While the invention has been described in detail and with reference to specific examples thereof, it will be apparent to one skilled in the art that various changes and modifications can be made therein without departing from the spirit and scope thereof.

What is claimed is:

1. A nonaqueous secondary battery comprising a positive electrode sheet containing a lithium-containing transition metal oxide as a positive electrode active material, a negative electrode sheet containing a negative electrode material capable of intercalating and deintercalating lithium, and a nonaqueous electrolyte containing a lithium salt, wherein a current collector of said positive electrode sheet is made of an aluminum foil containing 1.05 to 1.8% by weight of manganese and 0.1 to 1.4% by weight of magnesium, and has a thickness of 5 to 200 $\mu$m.

2. The nonaqueous secondary battery as in claim 1, wherein said aluminum foil has a tensile strength of 200 N/mm$^2$ or more at a room temperature.

3. The nonaqueous secondary battery as in claim 1, wherein said aluminum foil has a breaking extension of 0.4 to 6% from a room temperature to 250° C.

4. The nonaqueous secondary battery as in claim 1, wherein said positive electrode active material contains at least one lithium-containing transition metal composite oxide.

5. The nonaqueous secondary battery as in claim 1, wherein said negative electrode material is a metal or semimetal oxide.

6. The nonaqueous secondary battery as in claim 1, wherein said negative electrode material contains at least one oxide of a metal or semimetal selected from the group consisting of elements belonging to the groups 13 to 15 of the Periodic Table.

7. The nonaqueous secondary battery as in claim 6, wherein said negative electrode material is a composite oxide represented by formula (I):

$$SnM^1{}_aO_t \qquad (I)$$

wherein $M^1$ represents at least two elements selected from the group consisting of Al, B, P, Si and Ge; a represents a number of from 0.2 to 2; and t represents a number of from 1 to 6.

8. The nonaqueous secondary battery as in claim 6, wherein said negative electrode material is a composite oxide represented by formula (IV):

$$SnM^3{}_cM^4{}_dO_t \qquad (IV)$$

wherein $M^3$ represents at least two elements selected from the group consisting of Al, B, P, Si and Ge; $M^4$ represents at least one element selected from the group consisting of elements of the groups 1 to 3 of the Periodic Table and halogen elements; c represents a number of from 0.2 to 2; d represents a number of from 0.01 to 1; provided that 0.2<c+d<2; and t represents a number of from 1 to 6.

9. The nonaqueous secondary battery as in claim 1, wherein said aluminum foil has been heat treated at a temperature of 150 to 350° C. before battery assembly.

* * * * *